United States Patent [19]

Bergmans

[11] Patent Number: 5,003,555
[45] Date of Patent: Mar. 26, 1991

[54] DATA TRANSMISSION SYSTEM COMPRISING A DECISION FEEDBACK EQUALIZER AND USING PARTIAL-RESPONSE TECHNIQUES

[75] Inventor: Johannes W. M. Bergmans, Tokyo, Japan

[73] Assignee: U.S. Philips Corporation, New York, N.Y.

[21] Appl. No.: 377,364

[22] Filed: Jul. 7, 1989

Related U.S. Application Data

[63] Continuation of Ser. No. 203,655, Jun. 7, 1988, Pat. No. 4,866,736.

[30] Foreign Application Priority Data

Jun. 9, 1987 [NL] Netherlands .................. 8701331

[51] Int. Cl.⁵ .................. H03H 7/30; H03H 7/40
[52] U.S. Cl. .................. 375/12; 375/18; 375/103
[58] Field of Search .............. 375/12, 13, 14, 18, 375/96, 103; 364/724, 572, 574, 825; 333/18, 28 R; 178/68

[56] References Cited

U.S. PATENT DOCUMENTS

| | | | |
|---|---|---|---|
| 4,228,517 | 10/1980 | Constant | 375/12 |
| 4,243,956 | 1/1981 | Lemoussu et al. | 375/12 |
| 4,615,038 | 9/1986 | Lim et al. | 375/14 |
| 4,709,374 | 11/1987 | Farrow | 375/13 |

Primary Examiner—Douglas W. Olms
Assistant Examiner—Stephen Chin
Attorney, Agent, or Firm—Anne E. Barschall

[57] ABSTRACT

A system for transmitting an n-level data signal ($d_k$) at a given symbol rate 1/T comprises a data transmitter (1), a transmission channel (2) and a data receiver (3) with an equalizer (30) of the decision feedback type. By arranging this equalizer (30) for forming an estimate ($c_k$) of a virtual m-level data signal ($c_k$) instead of the output signal ($b_k$) of the data transmission (1) error propagation in the equalizer (30) is considerably reduced without thereby appreciably adding to the implementation-complexity of the system.

12 Claims, 3 Drawing Sheets

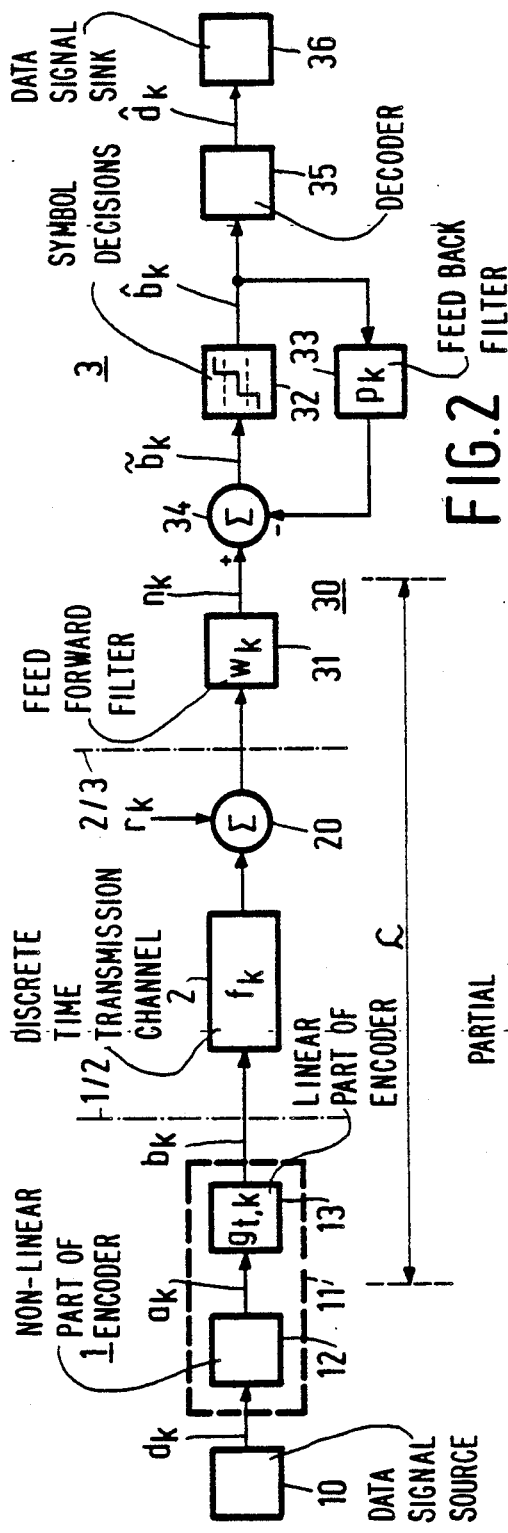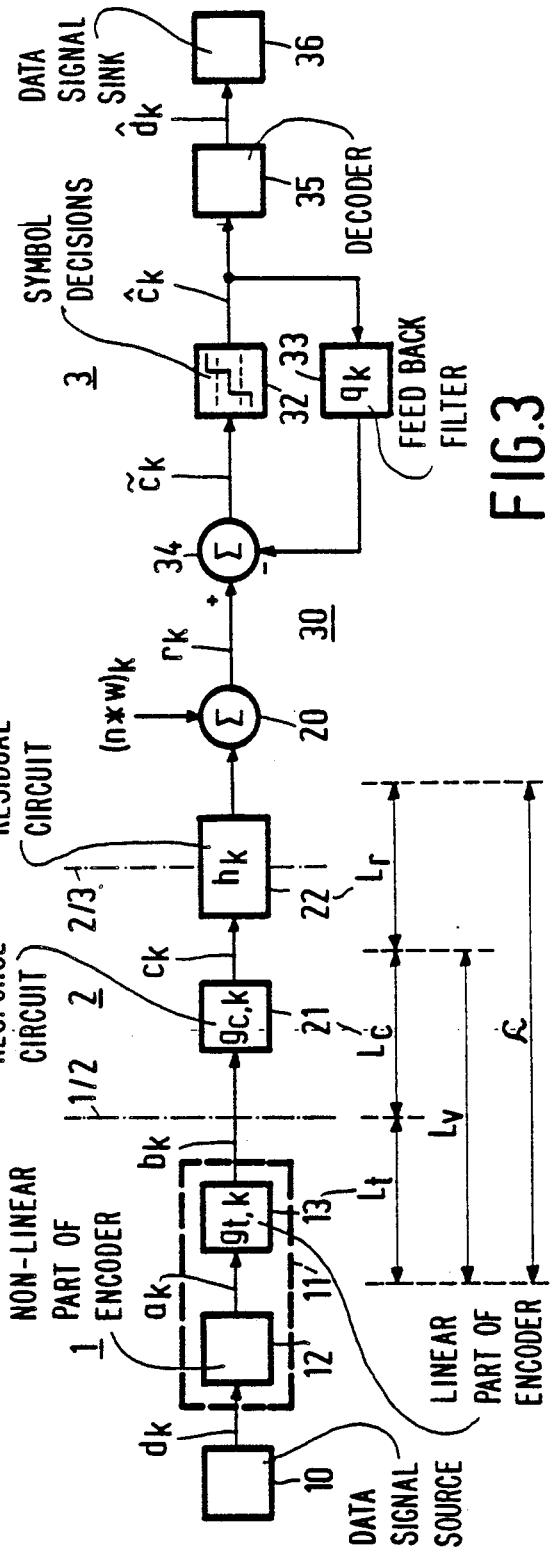

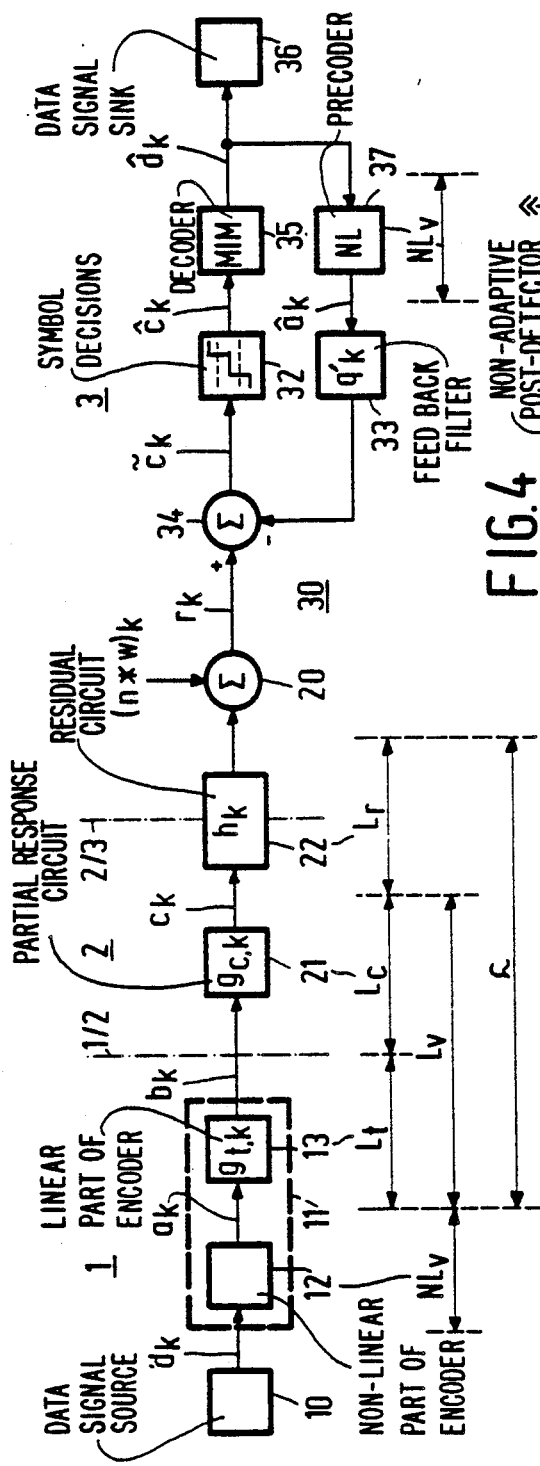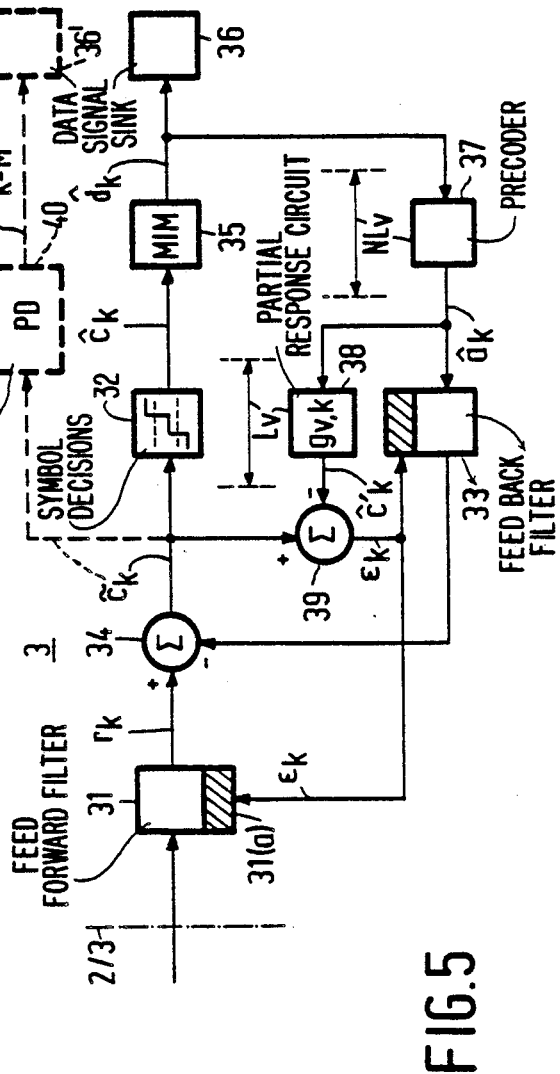
FIG.4
FIG.5

DATA TRANSMISSION SYSTEM COMPRISING A DECISION FEEDBACK EQUALIZER AND USING PARTIAL-RESPONSE TECHNIQUES

This is a continuation of application Ser. No. 203,655, filed June 7, 1988, U.S. Pat. No. 4,866,736.

BACKGROUND OF THE INVENTION

The invention relates to a system for transmitting an n-level data signal at a given symbol rate 1/T. This system being including by a data transmitter with a data signal source, a transmission channel and a data receiver with an equalizer of the decision feedback type, which equalizer comprises a feedforward filter connected between the input of the data receiver and a first input of a difference circuit, a symbol decision circuit connected to the output of the difference circuit, and a feedback filter connected between the output of the symbol decision circuit and a second input of the difference circuit, in which the linear part of the transmission path between the output of the data signal source and the first input of the difference circuit can be described by a linear signal transformation L.

Such a system is generally known and is described, for example, in the book "Digital Communications" by J. G. Proakis, McGraw-Hill, 1983, Chapter 6, Section 6.5, pp. 382-386. In such systems the feedforward filter belonging to the equalizer provides for suppression of noise and cancellation of pre-cursive intersymbol interference (ISI), whilst post-cursive intersymbol interference (ISI) is cancelled with the aid of the feedback filter synthesizing a replica of this interference on the basis of the symbol decisions already formed, by which replica is subtracted from the output signal of the feedforward filter. In the system known from the book by Proakis the equalizer is arranged for forming at the input of the symbol decision circuit an estimate of a data signal generated by the data transmitter. Normally, this estimate relates to the original n-level data signal, but in the case when the data transmitter includes a linear encoder, it is likewise possible to have this estimate relate to the output signal of the encoder and reconstruct in the data receiver the original n-level data signal from the symbol decisions formed then. The latter possibility occurs, for example, in ISDN transmission systems in which pseudo-ternary transmission codes are used, compare the article "A Baud-Rate Line-Interface for Two-Wire High-Speed Digital Subscriber Loops" by C. A. Ehrenbard and M. F. Tompsett, Proc. GLOBE-COM 1982, Miami, USA, pp. D. 8.4.1-D.8.4.5, in which the use of a bipolar transmission code is described.

In strongly dispersive transmission channels the output signal of the feedforward filter shows a strongly post-cursive intersymbol interference (ISI). Since the feedback filter has to synthesize a replica of this post-cursive ISI, erroneous symbol decisions applied to the feedback filter will more seriously affect subsequent symbol decisions according as the transmission channel is more dispersive. This undesired continuing influence of erroneous symbol decisions is known as error propagation and entails a degradation of the transmission quality, as appears, for example, from FIG. 6.5.2 on page 386 of the above book by Proakis.

SUMMARY OF THE INVENTION

The invention has for its object to provide a novel concept of a system of the type set forth in the preamble in which the said error propagation is reduced considerably without appreciably adding to the implementation-complexity of the system.

Thereto, a system according to the invention is characterized in that the equalizer is arranged for forming at the input of the symbol decision circuit an estimate of a virtual m-level data signal correlating with the n-level data signal applied to the input of the linear part of the transmission path according to a linear signal transformation $L_v$ which substantially characterizes the linear signal transformation L and corresponds with a partial-response polynomial $g_v(D)$ with D being a delay operator representing the symbol interval T.

For completeness it should be observed that the m-level data signal to be estimated is virtual if and only if $g_v(D) \neq 1$, and if also $g_v(D) \neq g_t(D)$, where $g_t(D)$ is the partial-response polynomial corresponding with a linear signal transformation $L_t$ optionally performed in the data transmitter.

The post-cursive ISI in the output signal of the feedforward filter is substantially described by the linear signal transformation $L_v$. According to the partial-response technique which is used in conformity with the novel concept, the major part of this ISI may be considered to be controlled desired ISI, so that only a small amount of undesired residual ISI remains which has to be cancelled by the feedback filter. The achieved reduction of the amplitude of the feedback filter output signal results in the erroneous symbol decisions applied to the feedback filter having a weaker strong influence on subsequent symbol decisions, therby achieving the intended reduction in error propagation.

An embodiment of the system according to the invention that is attractive with respect to its implementation is characterized in that the data transmitter comprises a precoder connected between the data signal source and the input to the linear part of the transmission path for performing a non-linear signal transformation $NL_v$ which is unambiguously determined by the linear signal transformation $L_v$, in conformity with the partial-response technique, and in that the feedback filter in the data receiver is connected to the output of the symbol decision circuit through a decoder and a precoder which is identical with the precoder in the data transmitter, said decoder performing a memoryless inverse signal transformation $L_v^{-1} \cdot NL_v^{-1}$ which converts the m-level symbol decisions into an n-level data signal corresponding with the original n-level data signal. The precoder connected to the decoder subsequently converts this n-level data signal into a replica of the precoded n-level data signal generated in the data transmitter applied to the input to the linear part of the transmission path. In this way the condition generally to be imposed on decision feedback equalization that the input signal of the feedback filter is linearly related to the output signal of the feedforward filter is satisfied. Besides, an n-level data signal is applied to the feedback filter, and because n is smaller than m, a digital implementation of this filter is thus simpler than when the formed m-level symbol decisions are applied directly.

A further advantage of this embodiment is the possibility of adaptively adjusting the feedback filter and also the feedforward filter in the data receiver of the system under control of an error signal which can be simply obtained and is representative of the difference between the input signal of the symbol decision circuit and a symbol that can be derived from the input signal of the feedback filter by performing the linear signal transformation $L_v$.

This adaptive embodiment finally enables to further improve the already achieved transmission quality by adding a relatively simple non-adaptive post-detector to which the input signal of the symbol decision circuit is applied.

BRIEF DESCRIPTION OF THE DRAWING

The invention will be further explained hereinbelow with reference to the drawing, in which:

FIG. 2 shows a functional discrete-time model of the system of FIG. 1 when conventional measures are employed;

FIG. 3 shows a functional discrete-time model of the system of FIG. 1 when the measures according to the invention are employed;

FIG. 4 shows a functional discrete-time model of an attractive embodiment of a system according to the invention; and FIG. 5 shows a functional discrete-time model of an adaptive embodiment of a receiver of a system according to the invention.

DETAILED DESCRIPTION OF THE PREFERRED EMBODIMENT

Figure 1:
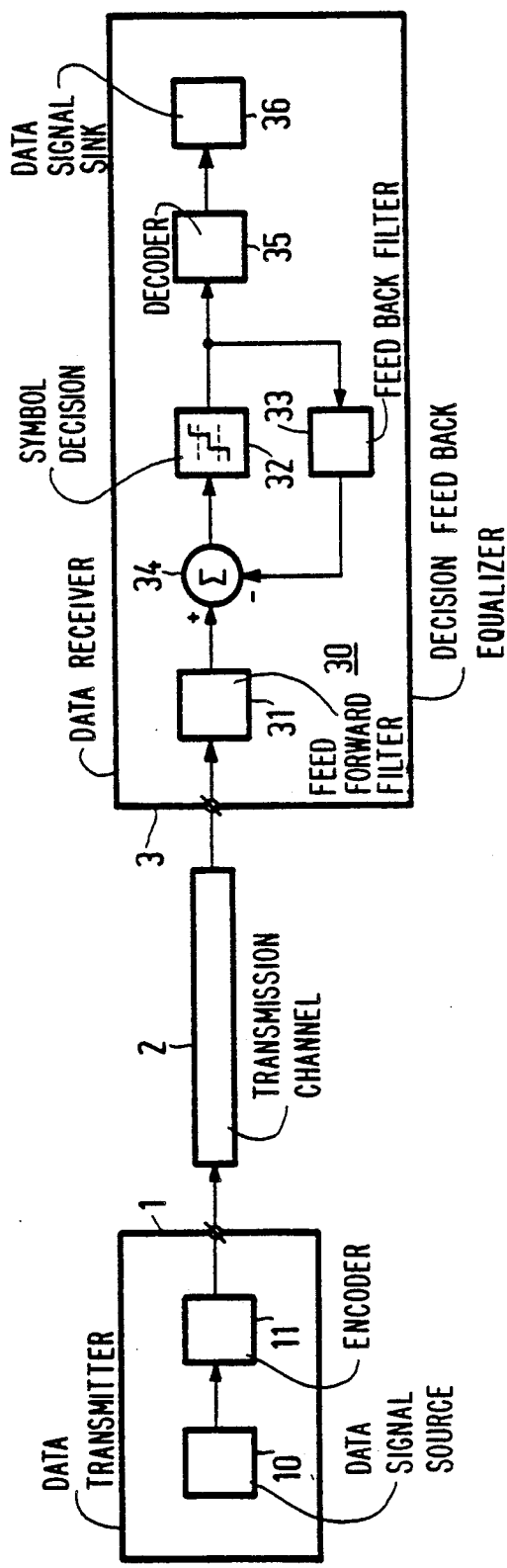
FIG. 1 shows a block diagram of a conceptual embodiment of a data transmission system in which the invention can be used.

In FIG. 1 a block diagram is shown of a system for data signal transmission with a data transmitter 1, a transmission channel 2 and a data receiver 3. The data transmitter 1 comprises a data signal source 10 for generating a data signal. This data signal is converted by an encoder 11 into a data signal which is transmitted through transmission channel 2 at a symbol rate 1/T. The intersymbol interference (ISI) and noise developed during this transmission are combated in the data receiver 3. Thereto, data receiver 3 comprises an equalizer 30 of the decision feedback type which includes a feedforward filter 31 which is dimensioned for suppressing in the best way possible pre-cursive ISI and noise. On the basis of symbol decisions which are formed in a symbol decision circuit 32 a feedback filter 33 subsequently forms a cancelling signal for post-cursive ISI which is subtracted from the output signal of feedforward filter 31 by means of a difference circuit 34 for obtaining the input signal of symbol decision circuit 32. Finally, from the formed symbol decisions a decoder 35 forms a replica of the original data signal which is applied to a data signal sink 36.

To illustrate the problem for which the invention provides a solution, FIG. 2 shows a functional discrete-time model of the system of FIG. 1 when employing conventional measures. In the FIGS. 1 and 2 corresponding elements are denoted by the same reference symbols. The model of FIG. 2 is given for the case in which data signal source 10 generates a binary data signal and data transmitter 1 applies a ternary data signal to transmission channel 2.

A binary data signal $d_k$ generated by data signal source 10 is converted by a non-linear part 12 of the encoder 11 into a likewise binary data signal $a_k$ which, subsequently, by the linear part 13 of the encoder 11 is converted into a ternary data signal $b_k$ to be applied to discrete-time transmission channel 2. To characterize the operation performed in this linear part 13 a partial-response polynomial $g_t(D)$ can be used, D being a delay operator representing the symbol interval T. Further details about these partial-response polynomials are to be found, for example, in the article "Partial-Response Signaling" by P. Kabal and S. Pasupathy, IEEE trans. Commun., Vol. COM-23, No. 9, pp. 921–934, Sept. 1975. For explaining the following description it should be observed that such polynomials generally have a relatively low order and also, apart from an otherwise unimportant scale factor, only have integral-valued coefficients. In the present case, for the purpose of illustration, the bipolar response 1-D for the polynomial $g_t(D)$ is chosen such that $$b_k = a_k - a_{k-1}. \tag{1}$$

The ternary data signal $b_k$ is converted into an output signal $r_k$ by the cascade arrangement of transmission channel 2 and feedforward filter 31 in FIG. 1 according to $$r_k = (b*(f*w))_k + (n*w)_k, \tag{2}$$

where the symbol "*" denotes the linear convolution-operator, $f_k$ and $w_k$ represent the discrete-time impulse responses of transmission channel 2 and feedforward filter 31, respectively, and $n_k$ represents an additive discrete-time noise signal which is added by means of a summator 20.

With a proper dimensioning of the feedforward filter 31 of FIG. 1 it holds that the signal $r_k$ contains virtually only post-cursive ISI. This implies that $(f \cdot w)_k$ can significantly differ from zero only for non-negative instants k. In the present system post-cursive ISI is combated by making feedback filter 33 have a causal impulse response $p_k$ for which holds $$p_k = \begin{cases} 0, & k \leq 0, \\ (f*w)_k, & k \geq 1, \end{cases} \tag{3}$$

and applying to this feedback filter 33 the symbol decisions $\hat{b}_k$ which are formed by decision circuit 32. As a result of the causal character of feedback filter 33 its output signal is at any instant k only determined by symbol decisions $\hat{b}_{k-i}$ with $i \geq 1$ that have already been formed. Under normal operating conditions these symbol decisions are correct, so that the output signal of the feedback filter 33 can be described as $$(\hat{b}*p)_k = (b*p)_k. \tag{4}$$

The output signal $\tilde{b}_k$ of difference circuit 34 can now be described as $$\tilde{b}_k = r_k - (\hat{b}*p)_k. \tag{5}$$

In the case in which signal $r_k$ only contains post-cursive ISI, this formula when utilizing formulas (2), (3) and (4) can be simplified to $$\tilde{b}_k = b_k + (n*w)_k = b_k + n'_k, \tag{6}$$

where $n'_k$ represents the version of noise signal $n_k$ that is attennuated in amplitued by feedforward filter 31. According to the latter formula, in the absence of error propagation, at the input of symbol decision circuit 32 an ISI-free estimate $\tilde{b}_k$ is formed of the data signal $b_k$ at the output of data transmitter 1.

For strongly dispersive transmission channels 2 the output signal of feedforward filter 31 usually shows a strongly postcursive ISI because the impulse response $(f*w)_k$ for $k \geq 1$ significantly differs from zero. Consequently, the impulse response $p_k$ of feedback filter 33 according to formula (3) will also assume values significantly differing from zero for $k \geq 1$. This will unavoidably cause a relatively large effect of erroneous symbol decisions $\hat{b}_{k-i}$ with $i \geq 1$ that have already been formed on symbol decisions $\hat{b}_{k+i}$ with $i \geq 0$ that still have to be formed.

In FIG. 2 the cascade arrangement of the linear part 13 of encoder 11 in data transmitter 1, the transmission channel 2 and the feedforward filter 31 of equalizer 30 in data receiver 3 constitutes the linear part of the transmission path between the output of data signal source 10 and the first input of difference circuit 34. The operation of this cascade arrangement (13, 2, 31) can be described by a linear signal transformation L, as is symbolically shown in FIG. 2. Instead of inserting summator 20 at the input of feedforward filter 31 in this cascade arrangement (13, 2, 31) it is equally possible to insert same at the output of this feedforward filter 31 having impulse response $w_k$. On the basis of the above considerations it will be evident that in the latter case summator 20 has to add to the output signal of this cascade arrangement (13, 2, 31) an additive noise signal $(n*w)_k$ in order to produce the same signal $r_k$ at the first input of difference circuit 34 as in the case shown in FIG. 2.

The latter option is used for elucidating the description of FIG. 3 showing a functional discrete-time model of the system of FIG. 1 when utilizing the measures according to the invention. In the FIGS. 1, 2 and 3 corresponding elements are denoted by the same reference symbols.

The linear part 13 of encoder 11 in FIG. 3 again performs an operation which is characterized by the partial-response polynomial $g_t(D) = 1 - D$. At the output of data transmitter 1 in FIG. 3 then again a ternary data signal $b_k$ according to formula (1) will occur $$b_k = a_k - a_{k-1} \qquad (7)$$

and at the first input of difference circuit 34 in data receiver 3 a signal $r_k$ according to formula (2)

$$r_k = (b*(f*w))_k + (n*w)_k. \qquad (8)$$

In many cases it is possible to present a relatively simple partial-response polynomial $g_c(D)$ such that the associated impulse response $g_{c,k}$—which is built up out of the respective coefficients of the polynomial —forms a proper styling of the impulse response $(f*w)_k$ of the cascade arrangement of transmission channel 2 and feedforward filter 31. This implies that the linear signal transformation corresponding with the impulse response $(f*w)_k$ representative of the overall linear transmission distortion can be considered to be built up as a sequence of partial-response transformation $L_c$ which corresponds with $g_c(D)$, and a residual transformation $L_r$ which takes into account the generally minor effect of the residual linear transmission distortion. In the present example, the duobinary response $1 + D$ is taken for $g_c(D)$, which response is illustrative of many transmission channels 2 having a low-pass character such as, for example, ISDN connections in the local public telephone network. This conceptual splitting-up is expressed in FIG. 3 by a partial-response circuit 21 corresponding with linear signal transformation $L_c$ and having an impulse response $g_{c,k'}$, which circuit 21 is followed by a residual circuit 22 corresponding with linear signal transformation $L_r$ and having an impulse response $h_k$. In partial-response circuit 21 ternary data signal $b_k$ at the output of data transmitter 1 is converted into a virtual m-level data signal $c_k$ (signal $c_k$ is a "virtual" signal because it is not explicitly visible at any point between the in and output of the physical transmission channel 2). Then, for this m-level data signal $c_k$ it holds that $$c_k = (b*g_c)_k, \qquad (9)$$

which expression for the assumed duobinary response $g_c(D) = 1 + D$ is simplified to $$c_k = b_k + k_{-1}. \qquad (10)$$

On the basis of formula (7) it then follows that $c_k$ is related to binary data signal $a_k$ at the input of linear part 13 of encoder 11 in data transmitter 1 according to $$c_k = a_k - a_{k-2}, \qquad (11)$$

so that $c_k$ in this case is a ternary data signal (thus m=3). This relationship can be described by a linear signal transformation $L_v$ which can be assumed to be built up as a sequence of partial-response transformations $L_t$ and $L_c$ which correspond with the polynomials $g_t(D)$ and $g_c(D)$, as represented in FIG. 3. The signal transformation $L_v$ then corresponds with a partial-response polynomial $g_v(D)$ for which holds $$g_v(D) = g_t(D) \cdot g_c(D). \qquad (12)$$

In the present example the bipolar response $1 - D$ is chosen for $g_t(D)$ and the duobinary response $1 + D$ for $g_c(D)$, so that $$g_v(D) = (1-D)(1+D) = 1 - D^2. \qquad (13)$$

In view of the generally relatively small residual transmission distortion which is represented by the impulse response $h_k$, the signal transformation L of the linear part (13, 2, 31) of the transmission path between the output of signal source 10 and the first input of difference circuit 34 is substantially characterized by the linear signal transformation $L_v$ which is performed by the cascade arrangement of linear part 13 of encoder 11 and partial-response circuit 21.

The described conceptual splitting-up becomes explicitly visible in data receiver 3 of FIG. 3 because in accordance with the invention equalizer 30 is arranged for forming at the input of symbol decision circuit 32 an estimate $\tilde{c}_k$ of the virtual data signal $c_k$ instead of an estimate $\tilde{b}_k$ of the data signal $b_k$ at the output of data transmitter 1. The task to be performed by the equalizer 30 is less exacting in the case of FIG. 3 in view of the relatively small residual transmission distortion which is represented by the impulse response $h_k$. This can be shown by a further analysis of the model of FIG. 3. As appears from the splitting-up of FIG. 3 the signal $r_k$ at the first input of difference circuit 34 can be written as $$r_k = (c*h)_k + (n*w)_k. \qquad (14)$$

By analogy with the foregoing, under normal operational conditions the already formed symbol decisions $\hat{c}_{k-i}$ with $i \geq 1$ may be assumed to be correct. Applying these correct symbol decisions to feedback filter 33, now having an impulse response $q_k$, then results in an output signal $$(\hat{c}*q)_k = (c*q)_k. \qquad (15)$$

By utilizing formulas (14) and (15) it now appears that at the input of symbol decision circuit 32 a signal $\tilde{c}_k$ develops having the form $$\tilde{c}_k = (c*h)_k - (c*q)_k + (n*w)_k. \qquad (16)$$

In order to let this signal $\tilde{c}_k$ be as good an approximation as possible of the virtual data signal $c_k$, it is necessary according to this formula that the impulse response $q_k$ of feedback filter 33 be a faithful copy of the causal part of the impulse response $h_k$, that is to say $$q_k = \begin{cases} 0, & k \leq 0, \\ h_k & k \geq 1, \end{cases} \qquad (17)$$

As appears from the foregoing, impulse response $h_k$ usually represents only a small amount of linear transmission distortion, so that the impulse response $q_k$ will take on relatively small values, and already formed erroneous symbol decisions $\hat{c}_{k-i}$ with $i \geq 1$ only affect to a limited extent the symbol decisions $\hat{c}_{k+i}$ with $i \geq 0$ still to be formed.

The reduction of error propagation achieved thus can be aptly illustrated with reference to the situation in which no residual linear transmission distortion occurs, so that $$h_k = \delta_k, \qquad (18)$$

where $\delta_k$ represents the Kronecker delta function. The linear signal distortion introduced by the cascade arrangement of transmission channel 2 and feedforward filter 31 can then be characterized exactly in both FIG. 2 and FIG. 3 by the partial-response transformation $L_c$, so that $$(f*w)_k = g_{c,k}. \qquad (19)$$

According to the conventional approximation of FIG. 2 the impulse response $p_k$ according to formula (3) is a replica of the part with $k \geq 1$ of $(f*w)_k$, that is to say $$p_k = \begin{cases} 0, & k \leq 0, \\ g_{c,k}, & k \geq 1, \end{cases} \qquad (20)$$

For the chosen duobinary response $g_c(D) = 1 + D$ it holds that $g_{c,1} = 1$ and $g_{c,k} = 0$ for $k \geq 2$, so that the first coefficient of the feedback filter 33 has a large non-zero value which may lead to significant error propagation. Conversely, the approximation according to the invention results in a feedback filter 33 whose impulse response $q_k$ is a replica of the part with $k \geq 1$ of the impulse response $h_k$, which part according to formula (18) is equal to zero for all $k \geq 1$. Consequently, all coefficients of feedback filter 33 are also equal to zero, so that error propagation is eliminated completely. It will be evident that this ideal situation, in which a feedback filter 33 is actually redundant, will not occur in practice. However, in general it will still hold that the first coefficients $q_k$ according to FIG. 3 then have a considerably smaller amplitude than the corresponding first coefficients $p_k$ according to FIG. 2, so that error propagation is accordingly smaller.

In the configuration as shown in FIG. 3 an m-level signal $c_k$ is applied to feedback filter 33, where m=3 for the present example with $g_v(D) = 1 - D^2$. By carrying out in encoder 11 of data transmitter 1 a suitable non-linear signal transformation $NL_v$, it is possible to reduce this number of m signal levels and thus simplify a digital implementation of feedback filter 33.

This possibility is represented in FIG. 4 showing a functional discrete-time model of a system according to the invention. In the FIGS. 3 and 4 corresponding elements are denoted by the same reference symbols.

In addition to the said non-linear signal transformation $NL_v$ other non-linear signal processes too can generally take place in the non-linear part 12 of encoder 11. To simplify the following description these other non-linear signal processes are assumed to be incorporated in data signal source 10.

As explained hereinbefore, the operation of equalizer 30 according to the invention is aimed towards combating the residual linear transmission distortion which is represented by the impulse response $h_k$. Consequently, with a proper functioning of equalizer 30 the relation between the data signal $a_k$ at the input of the linear part (13, 21, 22) of the transmission path and the input signal $\tilde{c}_k$ of symbol decision circuit 32 can also be characterized by the linear signal transformation $L_v$. Since this linear signal transformation $L_v$ in its turn is characterized by a partial-response polynomial $g_v(D)$, according to the said article by Kabal and Pasupathy there is a non-linear signal transformation $NL_v$ denoted "precoding" and having the feature that the sequence of the inverse operations $L_v^{-1}$ and $NL_v^{-1}$ of $L_v$ and $NL_v$, respectively, is a simple memoryless inverse signal mapping (MIM) which can be symbolically denoted $L_v^{-1} \cdot NL_v^{-1}$. By using this precoding $NL_v$ in the non-linear part 12 of encoder 11 it is achieved that from the formed symbol decisions $\hat{c}_k$ a direct estimate $\hat{d}_k$ of input signal $d_k$ of encoder 11 can be obtained by carrying out this memoryless inverse signal mapping MIM in decoder 35. By applying the data signal $\hat{d}_k$ obtained thus to a precoder 37 which is identical with precoder 12 in data transmitter 1, an estimate $\hat{a}_k$ is obtained of data signal $a_k$ at the input of the linear part (13, 21, 22) of the transmission path and this estimate $\hat{a}_k$ is applied to feedback filter 33. Thus, the condition generally to be imposed on the decision feedback equalization that the input signal of feedback filter 33 be linearly related to the signal at the first input of difference circuit 34 is satified. Since the precoded data signal $\hat{a}_k$ has the same number of n amplitude levels as the original data signal $d_k$, a digital implementation of feedback filter 33 is simpler in FIG. 4 than in FIG. 3, in which a data signal with m>n amplitude levels is applied to feedback filter 33. In the present example with $g_v(D) = 1 - D^2$ not a ternary, but a binary data signal is applied to feedback filter 33.

As appears from the foregoing, there is a relationship between the data signals $c_k$ and $a_k$ that can be characterized by the linear signal transformation $L_v$. Therefore, in absence of erroneous symbol decisions $\hat{c}_k$ the same holds for the relationship between the data signals $\hat{c}_k$ and $\hat{a}_k$ of FIG. 4. Expressed in a formula this means that $$\hat{c}_k = (\hat{a}*g_v)_k. \qquad (21)$$

In order to realize the same output signal of the feedback filter 33 in the configuration of FIG. 4 as in FIG. 3, feedback filter 33 in FIG. 4 has to have an impulse response $q_k'$, so that $$(\hat{a}*q')_k = (\hat{c}*q)_k. \tag{22}$$

On the basis of the relationship between the data signals $\hat{c}_k$ and $\hat{a}_k$ according to formula (21), $q_k'$ has to be related to $q_k$ according to formula (22) as $$q_k' = (q*g_v)_k. \tag{23}$$

The convolution in formula (23) generally has a shortening effect on the impulse response of feedback filter 33, as will now be explained.

In the absence of erroneous symbol decisions data signal $\hat{c}_k$ at the output of symbol decision circuit 32 has a controlled ISI structure which is characterized by the linear signal transformation $L_v$. For the prevailing partial-response transformations $L_v$ this structure leads to zeros in the amplitude spectrum of data signal $\hat{c}_k$, which zeros are often situated at the frequency 0 and/or at the Nyquist frequency $1/(2T)$.

As the above has shown, feedback filter 33 should cancel a residual transmission distortion which is represented by the impulse response $h_k$. The desired feedback filter output signal defined well in this manner has to be generated in FIG. 3 by a convolution of data signal $\hat{c}_k$ at its input and its impulse response $q_k$. As the amplitude spectrum of this input signal $\hat{c}_k$ has zeros at frequencies determined by $L_v$, the transfer function of feedback filter 33 around these frequencies can be chosen freely without an appreciable effect on the desired output signal. Especially with an adaptive adjustment of feedback filter 33 as shown in FIG. 3 this freedom may inadvertently result in feedback filter 33 having a large transfer at the said frequencies determined by $L_v$. Such a large transfer is attended with an impulse response $q_k$ of feedback filter 33 which extends over a large time span and/or has large amplitude values, and thus may lead to serious error propagation in both cases. According to formula (23) impulse response $q_k'$ of feedback filter 33 in FIG. 4 is determined by the convolution of the impulse response $g_{v,k}$, which itself is determined by the linear signal transformation $L_v$, and the just described impulse response $q_k$ of feedback filter 33 in FIG. 3. Thus, it is achieved that a possible large transfer of feedback filter 33 in FIG. 3 at the said frequencies determined by $L_v$ is cancelled completely or substantially completely in FIG. 4 by the very small transfer at these same frequencies of the impulse response $g_{v,k}$ likewise determined by $L_v$. Consequently, the impulse response $q_k'$ of feedback filter 33 in FIG. 4 will extend over a considerably smaller time span and/or have considerably smaller amplitude values than the impulse response $q_k$ of feedback filter 33 in FIG. 3, thus considerably reducing the risk of error propagation.

It will be evident that this advantage of reduced error propagation in data receiver 3 as shown in FIG. 4 is maintained if instead of virtual data signal $c_k$ the actually transmitted data signal $b_k$ is reconstructed by symbol decision circuit 32. Even then the configuration as shown in FIG. 3, in which symbol decisions $\hat{b}_k$ with respect to actually transmitted data signal $b_k$ are applied directly to feedback filter 33, could, according to the just described mechanism, lead to an impulse response $q_k$ of feedback filter 33 extending over a large time span and/or having large amplitude values. Thus, serious error propagation may occur. In the configuration as shown in FIG. 4 the corresponding impulse response $q_k'$ of feedback filter 33 leads, under the same circumstances, to a considerably smaller error propagation owing to the convolution of impulse response $q_k$ and the impulse response $g_{t,k}$ corresponding with linear signal transformation $L_t$ which is performed in linear part 13 of encoder 11 in data transmitter 1.

As explained hereinbefore, the advantages of a simplified implementation of feedback filter 33 and reduced error propagation realized by means of the configuration of FIG. 4 apply both in the case where at the input of symbol decision circuit 32 an estimate $\tilde{c}_k$ of virtual data signal $c_k$ is formed and in the case where an estimate $\tilde{b}_k$ of actually transmitted data signal $b_k$ is formed. Since these data signals $c_k$ and $b_k$, respectively, are related to data signal $a_k$ at the input of the linear part (13, 21, 22) of the transmission path via the linear signal transformations $L_v = L_t L_c$ and $L_t$, respectively, it is evident that said two advantages generally occur if at the input of symbol decision circuit 32 an estimate is formed of an m-level data signal that is related to n-level data signal $a_k$ according to a linear signal transformation $L$ with $L = L_v$ or $L = L_t$, which linear signal transformation $L$ corresponds with a partial-response polynomial $g(D) = g_v(D)$ and $g(D) = g_t(D)$, respectively.

An additional advantage of the configuration of data receiver 3 shown in FIG. 4 relates to the option of adaptively implementing feedback filter 33 and possibly also feedforward filter 31. This option is illustrated in FIG. 5.

In FIG. 5, both filters 31 and 33 now comprise an adaptation circuit 31(a) and 33(a), respectively, arranged according to conventional techniques. These adaptation circuits 31(a) and 33(a) are controlled by the same error signal $\epsilon_k$ which is representative of the difference between input signal $\tilde{c}_k$ of symbol decision circuit 32 and a data signal $\hat{c}_k'$. This data signal $\hat{c}_k'$ is derived in a simple way from the input signal $\hat{a}_k$ of feedback filter 33 by means of a partial-response circuit 38 in which the desired partial-response transformation $L_v$ is effected. By means of a difference circuit 39 the difference $\Delta_k$ between the signals $\tilde{c}_k$ and $\hat{c}_k'$ is formed, and in FIG. 5 this difference $\Delta_k$ is used directly as error signal $\epsilon_k$. As is well known, in adaptive filters prescribed functions of $\Delta_k$, such as, for example, strongly quantized versions of $\Delta_k$, can be used as error signal $\epsilon_k$ in order to simplify their digital implementation. When using the error signal $\epsilon_k$ thus obtained it is achieved in a simple manner that, after convergence of the adaptive filters 31 and 33, the data component $\tilde{c}_k - (n*w)_k$ of the input signal $\tilde{c}_k$ of symbol decision circuit 32 is related in the desired manner to the data signal $a_k$ at the output of precoder 12 in data transmitter 1, that is to say, via the desired linear signal transformation $L_v$ embedded in partial-response circuit 38. The apparently more obvious implementation, in which the in and output signals $\tilde{c}_k$ and $\hat{c}_k$ of symbol decision circuit 32 are used directly for forming the error signal $\epsilon_k$, true enough, also results in a linear relationship between the data component $\tilde{c}_k - (n*w)_k$ of $\tilde{c}_k$ and the data signal $a_k$ after adaptation of filters 31 and 33, but inevitably leads to the problem that it cannot be predicted a priori which linear relationship exactly will be established, so that an undesired adjustment of equalizer 30 cannot be precluded in advance.

It is evident that the latter advantage of a predictable convergence behaviour is maintained if a desired linear signal transformation $L=L_t$ instead of a desired linear signal transformation $L=L_y$ is performed in partial-response circuit 38. As already explained hereinbefore, this linear signal transformation $L=L_t$ leads to symbol decisions $\hat{b}_k$ of actually transmitted data signal $b_k$, so that in this case decoder 35 has to perform a memoryless inverse mapping $L^{-1} \cdot NL^{-1} = L_t^{-1} \cdot NL_t^{-1}$, whilst precoder 37 has to carry out the associated non-linear signal transformation $NL=NL_t$.

The predictable convergence behaviour of feedforward filter 31 and feedback filter 33 which is garanteed by partial-response circuit 38 in FIG. 5 leads to an input signal $\tilde{c}_k$ of symbol decision circuit 32 with a correlation structure substantially corresponding with the well-defined correlation structure of output signal $\hat{c}_k'$ of partial-response circuit 38, which correlation structure can be characterized by a partial-response polynomial $g_y(D)$ or $g_t(D)$. This well-defined correlation structure of input signal $\tilde{c}_k$ of symbol decision circuit 32 in FIG. 5 can now be used for realizing a further improvement of transmission quality by adding a non-adaptive post-detector 40 for forming final symbol decisions $\hat{d}_{k-M}$ which are applied to a data signal sink 36', as shown in FIG. 5 by way of a dashed line. Such a post-detector is known from an article "Maximum-Likelihood Sequence Estimation of Digital Sequences in the Presence of Intersymbol Interference" by G. D. Forney, Jr., published in IEEE Trans. Inform. Theory, Vol. IT-18, No. 3, pp. 363–378, May 1972. In this article a non-adaptive detector is described which is arranged for estimating the maximum-likeihood sequence of transmitted data symbols $d_k$ and thereto makes optimum use of the correlation structure of its input signal $\tilde{c}_k$. This leads to a transmission quality which is better than when making symbol-by-symbol decisions as performed in symbol decision circuit 32. For correlation structures of the partial-response type considered, according to the article by Forney improvements of transmission quality corresponding with an improvement of 2-3 dB in the signal-to-noise ratio are often obtainable in this manner. In addition, the implementation of non-adaptive post-detector 40 can remain relatively simple as a result of the low order and the resulting short memory span of the partial-response polynomial ($g_y(D)$ or ($g_t(D)$)) which determines the correlation structure of input signal $\tilde{c}_k$ of post-detector 40. Needless to observe that also different types of non-adaptive detectors exploiting this well-defined correlation structure for achieving an improved transmission quality can be used as post-detector 40 in FIG. 5. It will also be evident after the above explanation that in the non-adaptive configurations of the FIGS. 2, 3 and 4 it may be sensible to connect such a non-adaptive post-detector to the input of symbol decision circuit 32 for forming final symbol decisons $\hat{d}_{k-M}$ having a better quality than the decisions $\hat{d}_k$, but for simplicity, this option has not been shown any further in these Figures.

What is claimed is:

1. A data receiver comprising
   (a) an input; and
   (b) a decision feedback equalizer which includes:
      (i) a difference circuit having first and second inputs and an output;
      (ii) a feedforward filter coupled between the input of the data receiver and the first input of the difference circuit and incorporated in a linear part of a transmission path, which part is described by a linear signal transformation L, to which part is applied a derived n-level data signal derived from an original n-level data signal and having a symbol rate 1/T;
      (iii) a feedback filter having an output coupled with the second input of the difference circuit; and
      (iv) a symbol decision circuit having
         (A) an input coupled to the output of the difference circuit to receive therefrom an estimate of an m-level data signal related to the derived n-level data signal according to a linear signal transformation $L_t$, which substantially characterizes a linear portion of an encoder in a transmitter from which the original n-level signal originates, which transformation $L_t$ corresponds with a partial-response polynomial $g_t(D)$, with D being a delay operator representing the symbol interval T; and
         (B) an output coupled with an input of the feedback filter,
   where m and n are integers.

2. The data receiver of claim 1 further comprising:
   (a) a decoder performing a memoryless inverse signal transformation $L_t^{-1} \cdot NL_t^{-1}$ which converts m-level symbol decisions into an n-level data signal corresponding with the original n-level data signal, the decoder having an input coupled with the output of the symbol decision circuit; and
   (b) a precoder performing the non-linear signal transformation $NL_t$, which converts the n-level data signal at an output of the decoder into an n-level data signal corresponding to the derived n-level data signal; and wherein
   (c) the the input of the feedback filter is coupled to the output of the symbol decision circuit through the decoder and the precoder.

3. The data receiver of claim 1 further comprising a post detector having an input coupled with the input of the symbol decision circuit for forming a final estimate of the original n-level data signal.

4. The data receiver of claim 2 further comprising a post detector having an input coupled with the input of the symbol decision circuit for forming a final estimate of the original n-level data signal.

5. The data receiver of claim 1 further comprising:
   (a) a second difference circuit having first and second inputs and an output, the first input being coupled with the input of the symbol decision circuit and the output being coupled with a second input of the feedback filter to provide thereto an error signal; and
   (b) means for performing the linear signal transformation $L_t$, the performing means having an input coupled with the input of the feedback filter and an output coupled with the second input of the second difference circuit; and
   wherein
   (c) the feedback filter adaptively adjusts under control of the error signal.

6. The data receiver of claim 5 wherein
   (a) the output of the second difference circuit is further coupled with a second input of the feedforward circuit; and
   (b) the feedforward filter is adaptively adjusts under control of the error signal.

7. The data receiver of claim 2 further comprising:

(a) a second difference circuit having first and second inputs and an output, the first input being coupled with the input of the symbol decision circuit and the output being coupled with a second input of the feedback filter to provide thereto an error signal; and (b) means for performing the linear signal transformation $L_t$, the performing means having an input coupled with the input of the feedback filter and an output coupled with the second input of the second difference circuit; and wherein (c) the feedback filter adaptively adjusts under control of the error signal.

8. The data receiver of claim 7 wherein (a) the output of the second difference circuit is further coupled with a second input of the feedforward circuit; and (b) the feedforward filter is adaptively adjusts under control of the error signal.

9. The data receiver of claim 3 further comprising:

(a) a second difference circuit having first and second inputs and an output, the first input being coupled with the input of the symbol decision circuit and the output being coupled with a second input of the feedback filter to provide thereto an error signal; and (b) means for performing the linear signal transformation $L_t$, the performing means having an input coupled with the input of the feedback filter and an output coupled with the second input of the second difference circuit; and wherein (c) the feedback filter adaptively adjusts under control of the error signal.

10. The data receiver of claim 9 wherein (a) the output of the second difference circuit is further coupled with a second input of the feedforward circuit; and (b) the feedforward filter is adaptively adjusts under control of the error signal.

11. The data receiver of claim 4 further comprising:

(a) a second difference circuit having first and second inputs and an output, the first input being coupled with the input of the symbol decision circuit and the output being coupled with a second input of the feedback filter to provide thereto an error signal; and (b) means for performing the linear signal transformation $L_t$, the performing means having an input coupled with the input of the feedback filter and an output coupled with the second input of the second difference circuit; and wherein (c) the feedback filter adaptively adjusts under control of the error signal.

12. The data receiver of claim 11 wherein (a) the output of the second difference circuit is further coupled with a second input of the feedforward circuit; and (b) the feedforward filter is adaptively adjusts under control of the error signal.

* * * * *

UNITED STATES PATENT AND TRADEMARK OFFICE
CERTIFICATE OF CORRECTION

PATENT NO. : 5,003,555
DATED      : Mar. 26, 1991
INVENTOR(S) : Bergmans

It is certified that error appears in the above-indentified patent and that said Letters Patent is hereby corrected as shown below:

```
Colum 12, line 66, delete "is".

Column 13, line 19, delete "is".

Column 14, line 9, delete "is";
          line 29, delete "is".
```

Signed and Sealed this

Twenty-fifth Day of June, 1996

Attest:

BRUCE LEHMAN

Attesting Officer                Commissioner of Patents and Trademarks